United States Patent [19]

Grenlund

[11] 3,962,911

[45] June 15, 1976

[54] METHOD AND APPARATUS FOR COUPLING SIGNALS FROM A ROTATING DEVICE WITH END SHAFTS EXPOSED

[75] Inventor: Wesley E. Grenlund, Clinton, Wis.

[73] Assignee: Beloit Corporation, Beloit, Wis.

[22] Filed: Nov. 21, 1974

[21] Appl. No.: 525,936

[52] U.S. Cl. .............................. 73/88.5 R; 73/141 A
[51] Int. Cl.² ......................................... G01B 7/16
[58] Field of Search ......... 73/141 A, 88.5 R, 141 R; 340/189 M, 190, 206; 72/19

[56] References Cited

UNITED STATES PATENTS

| | | | |
|---|---|---|---|
| 2,176,720 | 10/1939 | Rayner et al. | 340/190 |
| 2,323,267 | 6/1943 | Wittkuhns et al. | 73/88.5 R |
| 3,246,308 | 4/1966 | Matthews | 340/189 M |
| 3,619,612 | 11/1971 | Belke et al. | 73/136 A |

Primary Examiner—James J. Gill
Assistant Examiner—Anthony V. Ciarlante
Attorney, Agent, or Firm—Hill, Gross, Simpson, Van Santen, Steadman, Chiara & Simpson

[57] ABSTRACT

The nip pressure of a rotating roll is measured and displayed through the utilization of techniques which include the transmission and reception of electromagnetic radiation. A pressure transducer is mounted on the inner surface of a roll shell and connected through a bore of a roll shaft to a light transmitting circuit. The light transmitting circuit is mounted in a housing on the end of the shaft and includes a voltage/frequency converter connected to the pressure transducer for converting pressure indicative voltages to pulses. These pulses activate a lamp driver for energizing a lamp which is mounted for radiation along the axis of rotation. An electromagnetic radiation receiver, in the form of a phototransistor, converts the received radiation into an electrical signal which is displayed as a digital representation of nip pressure and/or as a voltage (pressure) profile on an oscilloscope.

7 Claims, 7 Drawing Figures

TRANSMITTER-22

RECEIVER-28

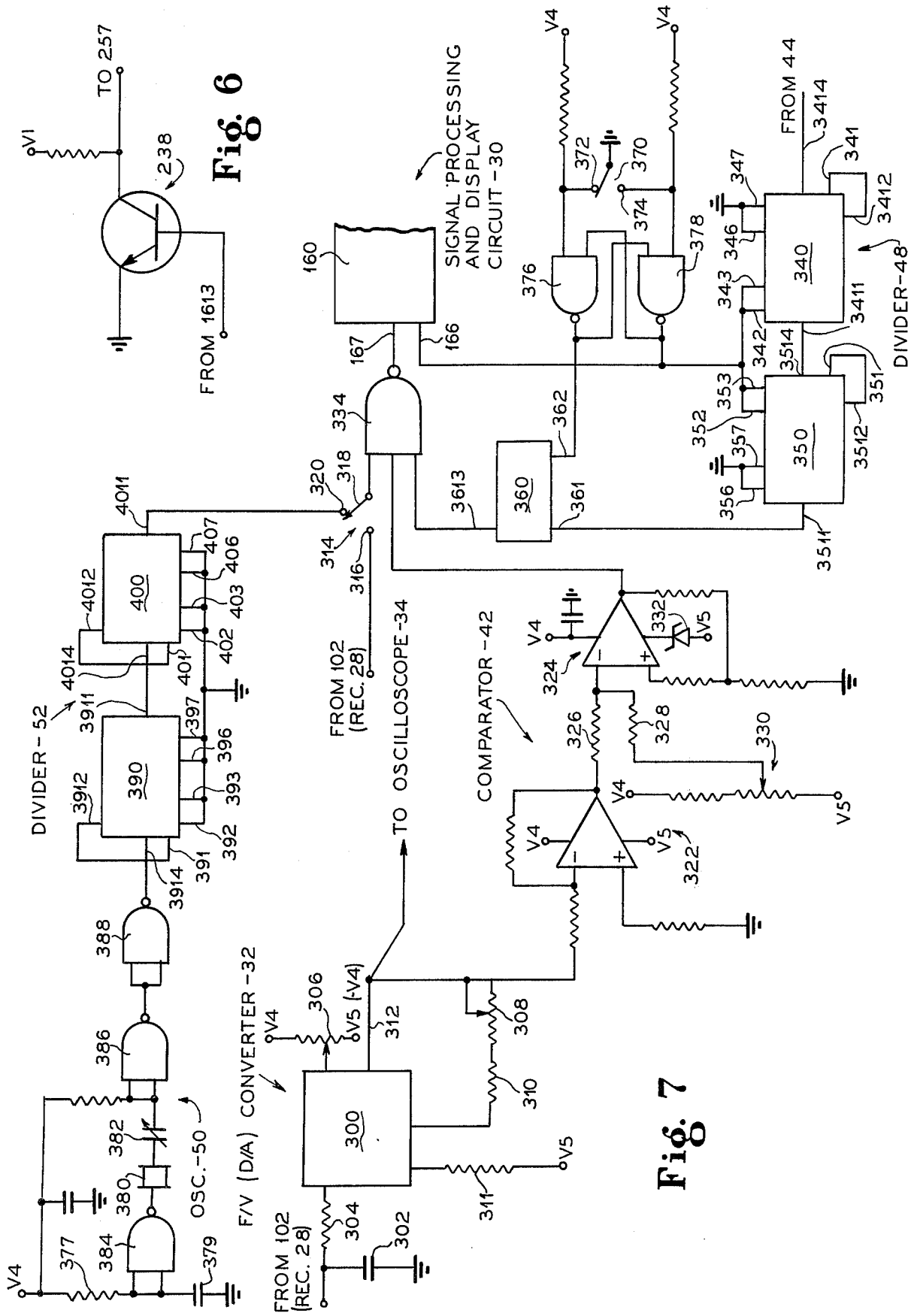

METHOD AND APPARATUS FOR COUPLING SIGNALS FROM A ROTATING DEVICE WITH END SHAFTS EXPOSED

BACKGROUND OF THE INVENTION

1. Field of the Invention:

This invention relates to techniques for coupling signals from a rotating device, and more particularly to a method and apparatus for measuring nip pressure of a rotating roll, such as a press roll or a calender roll.

2. Description of the Prior Art

It is common practice in the papermaking industry to sense nip pressure by mounting a transducer within a roll and coupling pressure indicative signals generated by the transducer to an external measuring and indicating circuit. Heretofore this has entailed the use of slip ring assemblies which comprise slip rings and brushes. Inasmuch as this apparatus must be constantly operated, although nip pressure reading may not be constantly taken, slip ring assemblies must be precise and rugged, require a minimum of maintenance and have a long life. Also, inasmuch as strain gauges, thermocouples and the like are low signal devices, the signal to noise ratio is of importance and noise is generally kept at a low level through the use of special precious metal alloys. Accordingly, slip ring assemblies tend to be relatively expensive.

This expense may become compounded when it is necessary to couple signals from a number of separate rotating rolls, as may be the case in a large papermaking, press or printing facility.

SUMMARY OF THE INVENTION

It is therefore the primary object of the present invention to provide techniques, including a method and apparatus, for coupling signals from a rotating device without the utilization of a slip ring assembly.

A more specific object of the invention is to couple signals from a rotating device by transmitting and receiving electromagnetic radiation indicative of a measured parameter, such as nip pressure.

Another object of the invention is to provide a method and apparatus for digitally displaying nip pressure in response to receipt of a signal representative of nip pressure.

Another object of the invention is to provide a display of voltage profile, corresponding to nip pressure, in the nip area of a rotating device in response to receipt of a signal representing nip pressure.

According to the invention, a method of measuring and displaying nip pressure of a rotating roll having a shell and an axis of rotation generally comprises the steps of sensing the nip pressure at the inner surface of the shell with a pressure transducer and generating first electrical signals representing nip pressure, feeding these signals to an electromagnetic wave generator which radiates a signal representative of nip pressure to an electromagnetic radiation receiver, converting the received radiation signals to electrical signals representing nip pressure and applying the last-mentioned electrical signals to indicating apparatus which provides a visual reading of nip pressure.

More specifically, in apparatus for transmitting signals representing nip pressure of a rotating roll to a receiver, the roll being of the type having a roll shell and a shaft connected to the roll shell for rotatably mounting the roll for rotation about an axis, a pressure transducer is mounted within the roll shell on the inner surface thereof and electrically connected to a voltage/frequency converter which converts the voltages produced by the transducer into corresponding pulse frequencies. The voltage/frequency converter is mounted in a housing which is, in turn, mounted on the end of the shaft, the shaft including a passageway therethrough for carrying the electrical connections between the transducer and the converter. The converter is connected to an electromagnetic wave generator for generating and radiating electromagnetic signals representative of nip pressure. The electromagnetic wave generator comprises a lamp and a lamp driver which is energized by the voltage/frequency converter. The lamp is mounted on the axis of rotation of the roll and preferably positioned to radiate outwardly along the axis of rotation.

The electromagnetic radiation receiver comprises a photo-transistor circuit for converting the light signal to electrical signals representative of nip pressure.

A signal processing circuit includes a light emitting diode (LED) display for digitally indicating nip pressure. The signal received from the phototransistor circuit is converted to a voltage pulse train and the voltage is displayed through the utilization of a MOSTEK counter and a MOSTEK programmable time base.

The counter is provided with a display up-date feature, so that only the digit that changes is up-dated, in response to a transfer command. This technique eliminates blinking usually seen in display systems.

The gate, transfer rate has been accurately provided as a one second unit by the programmable division ratio of the MOSTEK time base.

The LED display is multiplexed from the MOSTEK counter, in respect of which display is addressed, seven display segments being specifically disclosed. The display is energized through the utilization of a BCD to seven segment converter with current limiting, in connection with addressing the various segments to be lit per digit.

A most important feature of the invention resides in the provision of a digital display of data concerning the nip width. The output of the frequency/voltage converter, a D/A converter, is connected to a comparator circuit which has a trip point adjusted to a reference level, the reference level being adjusted by operating personnel to define trip points which correspond to the beginning and end of the nip in the circumferential direction about the roll in question. The output of the comparator is then used to control the counter as an electronic window equal to nip width. A crystal controlled clock and a digital divider chain feed the counter to provide the desired count. For example, if the pulse rate is 1 kHz, the count display would equal milliseconds of nip width. This provides the operating personnel the answer in time for data profile. The mean pressure for, say 100 revolutions, may also be provided by gating a burst of pulses into the counter each time the rolls meet. This bypasses the D/A converter and the time for counting the pulses is controlled by the aforementioned electronic comparator window. A photo scanner is employed to sense a reflective material on the roll in line with the transducer. The output of the scanner is then counted. In this example, at the end of 100 counts it toggles a flip-flop which inhibits further data counting. The information displayed in the output of the counter will be the mean pulse amplitude. A reset circuit is provided to reset the time and amplitude counters. This eliminates the need for an oscilloscope and camera to capture this information and permits a major savings in obtaining a roll profile. The second reason for this type of data gathering system is that an oscilloscope is not quite as accurate. For example, this type of data gathering system will provide readings of 0.1% or better as opposed to about 3% for the oscilloscope. This is important in respect of the time needed to gather data under test conditions and provides the operating personnel with information in seconds that would require a week using an oscilloscope and a camera.

BRIEF DESCRIPTION OF THE DRAWINGS

Other objects, features and advantages of the invention, its organization, construction and operation will be best understood from the following detailed description taken in conjunction with the accompanying drawing, on which:

FIG. 6 is a schematic circuit diagram of an amplifier utilized in the signal processing and display circuit of FIG. 5; and FIG. 7 is a schematic circuit diagram of apparatus for obtaining nip profile data which may be employed in practicing the present invention.

DESCRIPTION OF THE PREFERRED EMBODIMENTS

Figure 1:
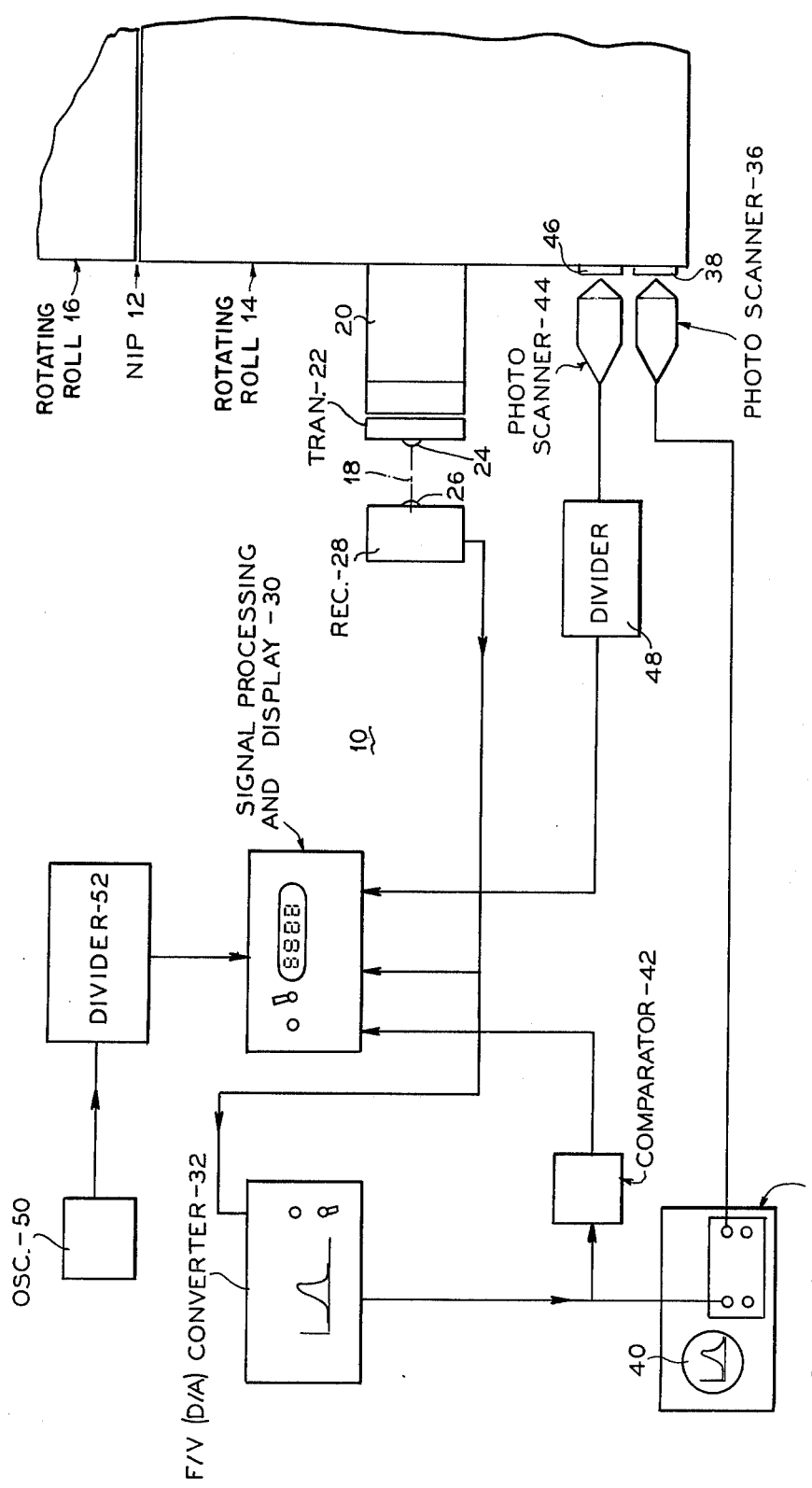
FIG. 1 is a schematic diagram of a data gathering system constructed in accordance with the invention.

Referring to FIG. 1, a nip data gathering system is generally illustrated at 10 as comprising a pair of rotating rolls 14 and 16 with a nip 12 therebetween the nip being the contact area of the rolls 14 and 16. The roll 14 is journaled (not illustrated) at its shaft 20 to rotate about a longitudinal axis 18 and carries, at the end of the shaft 20, an electromagnetic radiation transmitter 22 having a radiating device 24 for radiation of information along the axis 18.

A radiation receiving element 26 is mounted on the axis 18 in line with and spaced from the transmitting element 24 and is included in a radiation receiving circuit 28 which converts the received signals into pulses which are fed to a signal processing and display circuit 30.

The output signals of the receiver 28 may also be fed to a frequency/voltage (digital/analog) converter 32 for conversion into an analog signal which may be displayed on a cathode ray tube 40 of an oscilloscope 34.

The oscilloscope 34 is strobed during each revolution of the roll 14 when a pressure transducer (transducer 72, FIG. 2) is in the area of the nip 12, the strobing being effected by a light reflecting member 38, carried on the end of the drum, being sensed by a photo scanner 36 connected to the oscilloscope 34.

As will be understood from the description below, particularly in conjunction with FIG. 7, a comparator 42, a divider 48, photo scanning apparatus 44, 46 an oscillator 50 and a divider 52 are also provided for processing data concerning nip width and average nip pressure over a predetermined number of revolutions of the roll 14.

Figure 2:
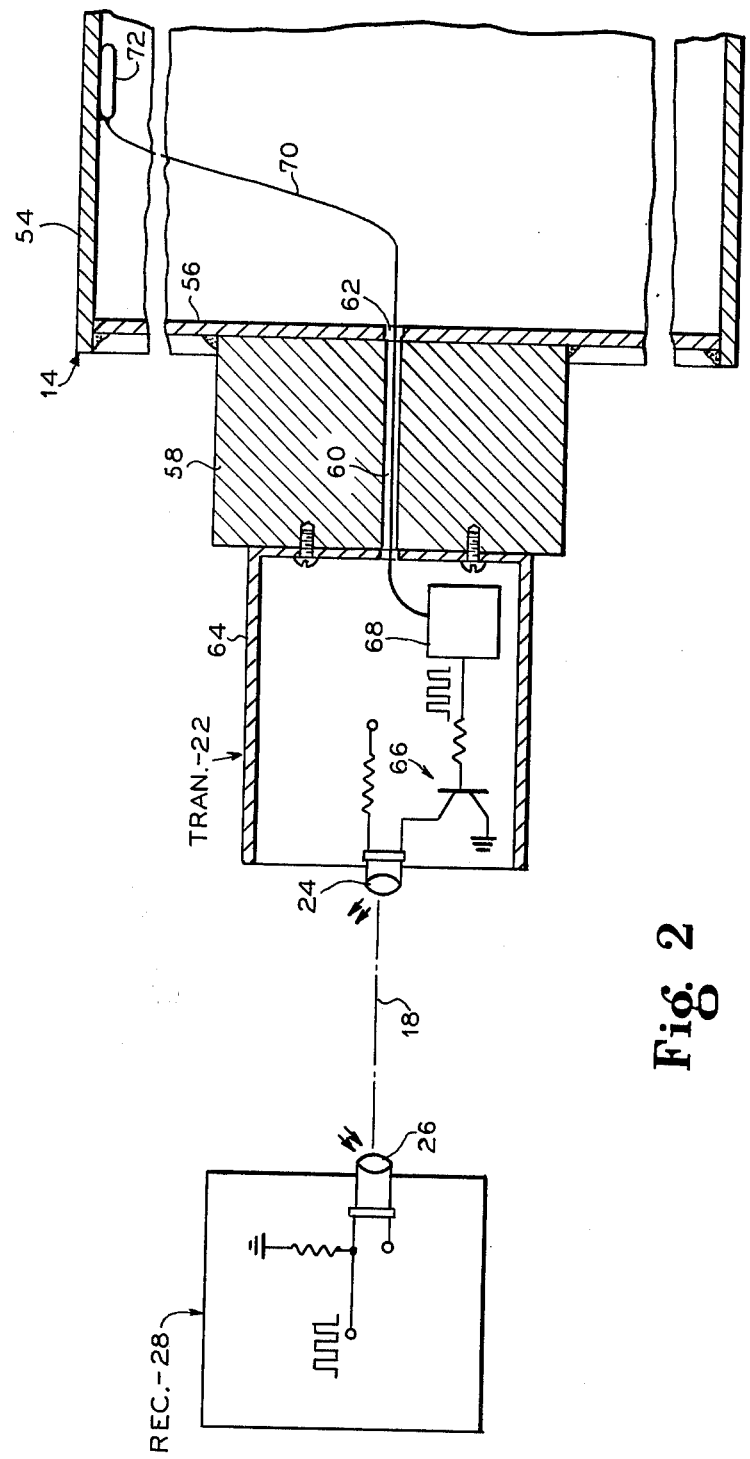
FIG. 2 is a simplified illustration of apparatus for obtaining, transmitting and receiving data which may be utilized in practicing the present invention.

Referring to FIG. 2, a simplified illustration of the roll 14 and the data flow to the receiver 28 is illustrated wherein the roll 14 includes a cylindrical shell 54 having a bulkhead 56 welded thereto which, in turn, supports, as by welding, an end shaft 58. For clarity, journaling of the end shaft has not been illustrated. The end shaft 58 includes a central bore 60 which communicates with a central bore 62 in the bulkhead 56 to receive electrical leads which are schematically illustrated at 70 from a pressure tranducer 72. As will be understood from the description concerning the apparatus of FIG. 3, the electrical leads 70 are connected to a voltage/frequency (analog/digital) converter 68 which feeds output pulses to a lamp driver 66 to operate a lamp 24.

As readily apparent from FIG. 2, the electromagnetic wave transmitter 22 transmits light signals along the axis 18 to a light receiving element 26 of the electromagnetic radiation receiver 28.

The transmitter 22 is mounted in a housing 64 which is secured to the end of the shaft 58, the housing also including the necessary power supply, such as a battery type supply.

Figure 3:
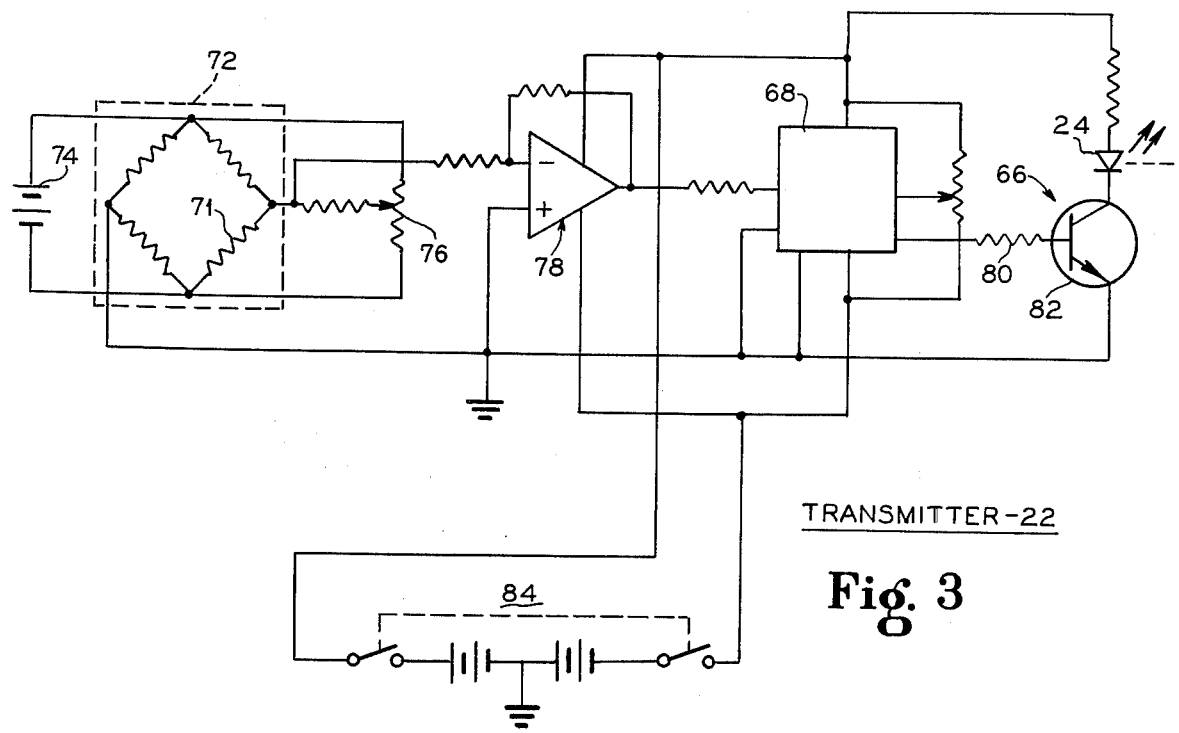
FIG. 3 is a schematic circuit diagram of the circuit for generating and transmitting nip pressure data.
Figure 4:
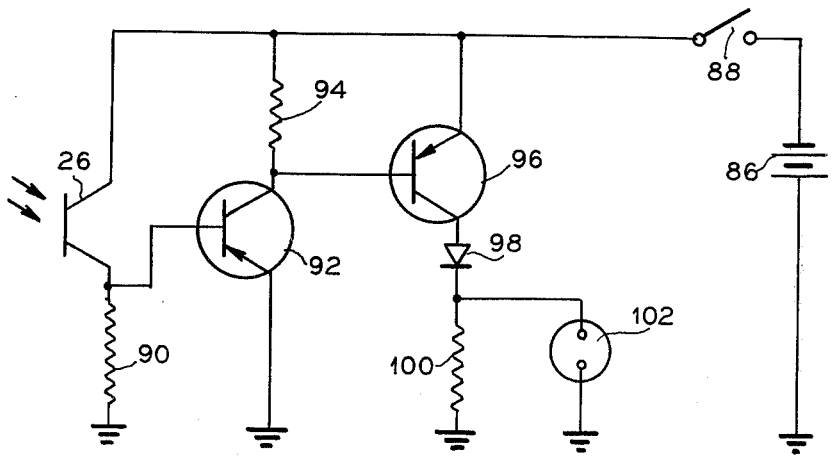
FIG. 4 is a schematic circuit diagram of a receiver circuit including a photo transistor for receiving information transmitted from the circuit of FIG. 3.

Referring to FIG. 3, the transducer 72 includes a plurality of resistors forming a balanced bridge circuit and may take the form disclosed by S. M. Salomon in his U.S. Pat. No. 3,464,887, issued Sept. 2, 1969 and assigned to Beloit Corporation. In this type of transducer circuit, a voltage supply, such as a battery 74, is applied to a pair of opposite bridge terminals and the circuit includes a resistive unbonded strain gauge, indicated by the resistor 71. An adjustable balancing resistor 76 is provided for balancing the entire circuit and includes a limiting resistor serially connected in the movable arm of the resistor 76.

The remainder of the individual circuits of the transmitter 22 are well known circuits, primarily integrated circuits, and convert the analog type output voltage of the transducer 72 into light pulses directed along the axis 18. The output signals from the transducer 72 are fed to a buffer amplifier 78 which in turn feeds a voltage/frequency converter 68 of the type well known in the art for example, a 4701 or 4703 type circuit may be employed for the voltage/frequency converter 68. The output of the circuit 68 is fed by way of a resistor 80 to a transistor 82 of the lamp driver circuit 66. The signals fed to the transistor 82 are pulses which are the digital equivalent of the analog signal of the transducer 72 and are used to drive the lamp 24 which may be of the type manufactured by the Miniature Lamp Department, General Electric, under the designations SSL-4F, SSL-5AF, SSL-5BF and SSL-5CF. As illustrated in FIG. 3, the transmitter 22 is powered by a battery 84.

Referring to FIG. 3, the receiver 28 is illustrated as comprising a photo transistor 26, which may be any one of the types TI63 through TI67 manufactured by Texas Instruments Incorporated. The transistor 26 includes an electrode connected by way of the switch 88 to a battery 86 and another electrode connected to ground by way of a resistor 90 for developing a voltage signal in response to receipt of light signals. The voltage signals are connected to an amplifier which includes a high beta transistor 92, a resistor 94 connected to the collector thereof, a transistor 96, a diode 98 connected to the collector of the transistor 96 and a resistor 100 for developing a receiver output signal, the output signal being taken off at an output jack 102. In a particular construction, the transistors 92 and 96 were MPSA 13 and ZN 4125 and the diode a light emitting MV 5025.

As discussed hereinabove, the transducer 72 generates an analog signal, due to the pressure encountered at the nip 12, and feeds these signals to the transmitter 22 which includes an analog/digital converter and an electromagnetic radiation transmitter. The transmitter generates, in this particular case, light pulses corresponding to the digital signal of the analog/digital converter, and radiates the same along the axis 18 to the receiver 28 which again converts the light pulses to electrical signals which are provided at the output 102. These electrical signals correspond to the pulses provided by the analog/digital converter 68 in the transmitter. The information contained in these signals is then utilized, as will be discussed below, to display different information concerning the nip as relates to nip pressure.

Figure 5:
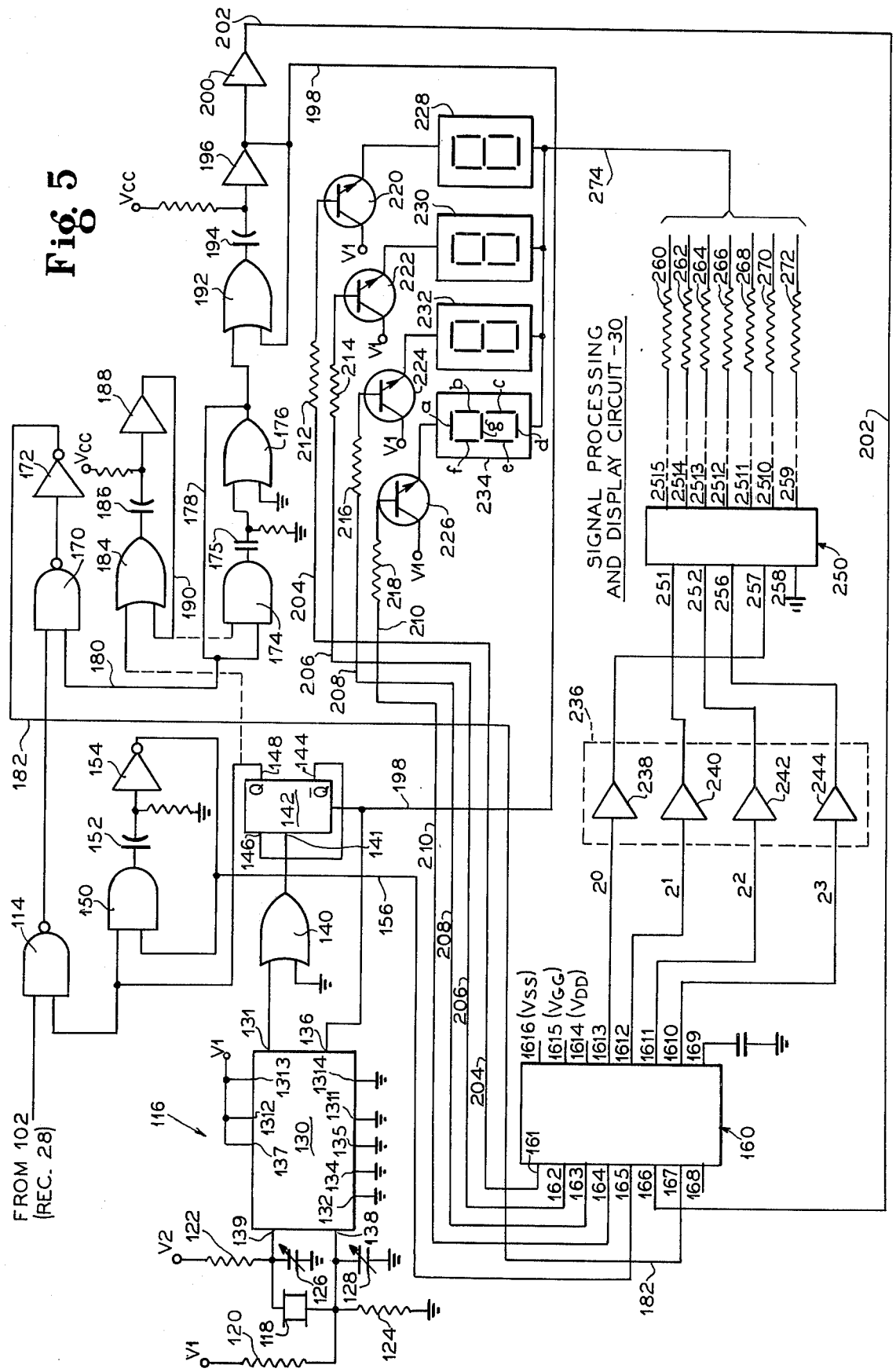
FIG. 5 is a schematic circuit diagram of a signal processing and display circuit which may be employed in practicing the present invention.

Referring to FIGS. 1 and 5, the signals from the receiver 28 are fed to a signal processing and display 30 and are received, as indicated in FIG. 5, at one input of a gate 114 to be counted by a counter 160 and displayed by a plurality of seven segment display elements 228–234. The display is accomplished by the use of a state of the art MOSTEK counter 160 and a MOSTEK programmable time base 130, the various gating techniques and circuits of the counter being accomplished with RCA Cosmos logic. The voltage/frequency converter, as mentioned above, converts the voltage to a pulse train and the pulse train is displayed as a voltage in pulses based on a one second time interval.

The seven segment display 228–234 is a light emitting diode (LED) display which is multiplexed from the counter 160 as to which display is being addressed. The circuit utilizes a binary coded decimal (BCD) to seven segment converter with current limiting in addressing the various segments to be lit per digit.

The counter utilizes a display up-date feature so that only the digit which changes is up-dated, on a transfer command. This technique eliminates the blinking displays usually seen in display systems.

The time base has its own internal oscillator and the feature of a programmable division ratio has been utilized to maximum advantage to obtain an accurate one second gate, transfer rate.

More specifically, the information received from the receiver 102 is fed by way of the gate 114, a gate 170, an inverter 172 and a lead 182 to the input 167 of the MOSTEK counter, which may be an MK 5007. In FIG. 5, the digits "16" of the leads of the counter 160 identify with the counter and the subsequent digits identify actual circuit terminals of the particular type of circuit used. This also holds true for the programmable time base which includes a circuit 130 which may be an MK 5009 and the circuit 250 which may be of the type 7447. The gate circuits, inverters and the flip-flop circuit 142 illustrated in FIG. 5 were constructed from well known circuits CD 4011, CD 4001, CD 4009 and CD 4013.

With the signals being fed in for processing, the same are gated, and reset of various circuits is accomplished, primarily under the control of a programmable time base 116 which includes a 1 MHz crystal 118 connected to the terminals 138 and 139 of the circuit 130, along with a plurality of resistors 120–124 and a pair of variable capacitors 126 and 128. The circuit 130 provides a series of pulses to a gate 140 to trigger a flip-flop 142 at its input 141. The flip-flop 142 includes an output 148 which is connected to a second input of the gate 114 and to an input of a gate 150 which generates a first pulse by way of a capacitor 152 and an inverter 154 which is fed by way of a conductor 156 to the transfer input 165 of the circuit 160. The input pulses are gated to the conductor 182 for the count input 167 of the counter 160 from the circuit including the output 148 of the flip-flop 142, a gate 184, a capacitor 186, an inverter 188, a gate 174, a capacitor 175, a gate 176 and by way of a conductor 180 to another input of the gate 170.

The flip-flop 142 includes another output 144 which is fed back to a set input 146 to keep the output 148 high until receipt of a reset signal.

The reset signal for the flip-flop 142 and for the circuit 130 is generated by the gate signal at the output of the gate 176 which is applied to a gate 192 to generate a reset signal by way of a capacitor 194 and an inverter 196, which signal is fed by way of a conductor 198 to the reset input of the flip-flop 142 and to the terminal 136 of the circuit 130. This same signal is processed by way of an inverter 200 and a conductor 202 to the reset input 166 of the circuit 160.

Inasmuch as the time base provides a one second gate, transfer rate, the first time base signal effects a closing of the gates in the signal path for counting and storing the pulse counts in the circuit 160, while the second time signal opens this circuit to stop counting. The circuit 160 includes an internal buffer which receives the count and passes the previously stored count forward toward the display circuits in response to the aforementioned transfer signal on the input 165.

The supply voltages utilized in a particular construction of the circuit illustrated in FIG. 5 included +5 volts for the potential V1 and −12 volts for the potential V2, while the voltages indicated at $V_{cc}$, $V_{ss}$, $V_{GG}$, and $V_{DD}$ are potentials prescribed for the particular circuits referenced above.

The outputs 161, 162, 163 and 164 of the counter circuit 160 are connected by way of respective conductors 204, 206, 208 and 210 and respective resistors 212, 214, 216 and 218 to the bases of a plurality of driver transistors 220, 222, 224 and 226. The collectors of these transistors are connected to the potential V1 and the emitters thereof are connected to LED displays 228, 230, 232 and 234, respectively, in a manner which is well known in the art. The individual segments a, b, c, d, e, f and g are connected by way of individual lines, here illustrated as a cable 274, to a BCD to seven segment conversion circuit.

The conversion circuit includes a plurality of amplifiers 236, individually referenced 238, 240, 242 and 244 connected to respective counter outputs 1613, 1612, 1611 and 1610 of the counter circuit 160 to receive the data therefrom with the binary weighting $2^0$, $2^1$, $2^2$ and $2^3$ as indicated on the drawing. The outputs of the amplifiers 238–244 are respectively connected to the inputs 257, 251, 252 and 256 of the circuit 250 which has its outputs 259, 2510, 2511, 2512, 2513, 2514 and 2515 connected by way of respective limiting resistors 272, 270, 268, 266, 264, 262 and 260 to corresponding segments of the LED displays 228–234.

With the aforementioned connections of the counter circuit 160 to the drivers 220–226 and to the segments *a–g*, the disply is multiplexed from the counter as to which display is being addressed and the individual segments for each digit are lit through the use of BCD to seven conversion. The digits displayed therefore correspond to the pressure encountered by the transducer in the nip 12.

FIG. 6 illustrates a particular circuit which may be employed for any one of the amplifiers 238–244, the amplifier 238 in particular being illustrated for connection between the output 1613 of the counter circuit 160 and the input 257 of the circuit 250.

Referring to FIGS. 1 and 7, the apparatus for obtaining additional data from the signals received from the nip area, including the converter 32, the comparator 42, the dividers 48 and 52 and the oscillator 50 in FIG. 1 are illustrated in greater detail in FIG. 7.

In FIG. 7 the signals received from the output 102 of the receiver 28 are fed to the digital/analog converter 32 (frequency/voltage converter) by way of a capacitor 302 and a resistor 304 to the input of a converter circuit 300 which may advantageously be a 4704 circuit which includes a frequency input by way of the resistor 304, and $E_{SQ}$ adjustment between potentials V4 (+ 15 volts) and V5 by way of a potentiometer 306, a reference feedback by way of an adjustable resistor 308 and a resistor 310 to a summing point and a reference input by way of a resistor 311. The digital/analog converter 32 includes an output 312 which may be connected to the oscilloscope 34 as explained above with respect to FIG. 1. This output may also be connected, as indicated in FIGS. 1 and 7, to a comparator circuit 42 which includes an operational amplifier 322 of conventional design whose output is connected to another conventional operational amplifier by way of a resistor 326. The same input to the operational amplifier 324 is connected to receive a reference potential by way of voltage divider connected between the potentials V4 and V5, including a variable resistor 330 which is connected to the input by way of a resistor 328. As an example, this trip point adjustment for the comparator may be set at the 5 volt level by an operator to indicate that signals above the reference level relate to pressure, while signals below the level relate to machine vibration and the like. Experience will show the exact reference level to be set. The operational amplifier 324 is also provided with a Zener diode 332 for establishing the output signal level of the amplifier. The output of the comparator circuit 42 is therefore a signal having a width corresponding to the nip width and can be used as an electronic window to control the operation of the counter circuit. Other counter circuits may be employed, but through the utilization of mode switches, such as the switch 314, the same signal processing and display circuit may be employed for displaying nip pressure, nip width and average nip pressure over a predetermined number of revolutions, with the circuits disclosed herein.

In order to display nip width, the comparator signal (electronic window) is fed to a gate 334 which has its output connected to the counting input 167 of the counter 160. A second input to the gate 334 is provided by way of a movable contact 318 and a fixed contact 320 of the mode switch 314 to connect the gate 334 to the oscillator 50 and divider 52.

The oscillator 50 is of generally conventional design and may advantageously comprise an RC circuit 377, 379 which is connected by way of a gate 384 to a 1 MHz crystal 380 and a variable capacitor 382. The variable capacitor 382 is connected to a gate 386 and via another gate 388 to the divider 52. The divider 52 is of conventional design and employs a pair of bistable circuits, each of which may consist of a 7490 circuit, to divide the pulse count to provide a predetermined pulse rate at the output 4011. Attention is invited that the last digit or digits of the circuits 390 and 400 identify the actual pin connections to the 7490 type circuit.

The predetermined pulse rate is, for example, 1 KHz. Assuming that the input connection 3613 to the gate 334 is of a character to open the gate in conjuction with the signal from the comparator 42 and from the divider 52, the counter 160 is operated to illuminate the display with a pulse count which equals milliseconds of the nip width.

In order to provide a reading of mean pressure for, say 100 revolutions of the roll 14, the mode switch 314 is operated to connect the contacts 318 and 316. The information provided to the gate 334 is of the same character discussed above with respect to the radiation receiver 22 and the comparator 42.

The third input of the gate 334 is obtained from the divider circuit 48. Turning back to FIG. 1 for a moment, a photo scanner 44 senses a reflective material 46 on the roll which is either in line with the transducer or positioned to operate the photo scanner 44 when the tranducer is in the nip area. The output pulse for each revolution is fed to an input 3414 of a counter circuit 340 which has an output 3411 connected to an input 3514 of the counter 350. Each of these counters may also be 7490 circuits. The circuit 350 includes an output 3511 which is connected to an input 361 of a flip-flop 360. Upon each revolution, the pulses received from the receiver 28 are counted during the electronic window provided by the comparator 42. At the end of 100 counts (100 revolutions) the flip-flop 360, which may be a 7473 circuit, is toggled by the divider 48 to prevent further counting. The information displayed is therefore the mean pulse amplitude. A reset circuit in the form of a pair of gates 376 and 378 connected as a bistable circuit, provide reset pulses to the counter 160, to the divider 48 and to the flip-flop 360 depending on the position of the switch contact 370 with respect to the switch contacts 372 and 374, a technique well known in the art.

Although the system disclosed herein contemplates the use of an oscilloscope 34 for reading nip data, the latter described circuits eliminates the need fro an oscilloscope and camera to capture this information and permits a major savings in obtaining a roll profile. Also, as previously mentioned, the digital output is substantially instantaneous and is of much greater accuracy than information obtained from an oscilloscope.

Although I have described my invention by reference to particular illustrative embodiments thereof, many changes and modifications of the inventions may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for measuring nip pressure of a roll having a roll shell and a shaft for rotatably mounting the roll shell for rotation about an axis, comprising:
   a pressure transducer mounted on the inner surface of the roll shell;
   an electromagnetic wave generator mounted on the end of the shaft for radiating electromagnetic signals in response to voltage signals;
   a passageway through said shaft and electrical connections extending through said passageway between said pressure transducer and said electromagnetic wave generator;
   an electromagnetic wave receiver for receiving the radiated signals, including means for converting the radiated signals to electrical signals; and
   display means for indicating nip pressure, said display means including
     first means for converting said electrical signals to electrical pulses,
     second means for counting said pulses, and
     third means for displaying nip pressure as a function of pulse count.

2. Apparatus for displaying nip pressure profile information of a roll having a shell and rotating about an axis, comprising:
   a pressure transducer connected to the roll shell and operable to produce a first analog signal representing the pressure profile across the width of the nip;
   an analog/digital converter connected to said pressure transducer to change said first analog signal to a digital signal;
   a digital data transmitter connected to said analog/digital converter to transmit the digital information of said digital signal along a path;
   a signal receiver on the path for receiving the digital information and regenerating the digital signal;
   a digital/analog converter connected to said signal receiver for converting the regenerated digital signal to a second analog signal representing the pressure profile across the width of the nip;
   a strobe signal generator coupled to the roll for generating a strobe signal while said pressure transducer is in the nip area; and
   an oscilloscope connected to said strobe signal generator and to said digital/analog converter for displaying the pressure profile across the width of the nip.

3. Apparatus for displaying nip pressure profile information of a roll having a shell and rotating about an axis, comprising:
   a pressure transducer connected to the roll shell and operable to produce a first analog signal representing the pressure profile across the width of the nip;
   an analog/digital converter connected to said pressure transducer to change said first analog signal to a digital signal;
   a digital data transmitter connected to said analog/digital converter to transmit the digital information of said digital signal along a path;
   a signal receiver on the path for receiving the digital information and regenerating the digital signal;
   a digital/analog converter connected to said signal receiver for converting the regenerated digital signal to a second analog signal representing the pressure profile across the width of the nip;
   clock means operable to produce pulses at a predetermined frequency;
   gating means connected to said clock means and to said digital/analog converter; and
   digital display means connected to said gating means for displaying pulse counts, the displayed count corresponding to nip width in time.

4. Apparatus for displaying nip pressure profile information of a roll having a shell and rotating about an axis, comprising:
   a pressure transducer connected to the roll shell and operable to produce a first analog signal representing the pressure profile across the width of the nip;
   an analog/digital converter connected to said pressure transducer to change said first analog signal to a digital signal;
   a digital data transmitter connected to said analog/digital converter to transmit the digital information of said digital signal along a path;
   a signal receiver on the path for receiving the digital information and regenerating the digital signal;
   a digital/analog converter connected to said signal receiver for converting the regenerated digital signal to a second analog signal representing the pressure profile across the width of the nip;
   digital display means for receiving and displaying pulse count;
   clock means operable to produce pulses at a predetermined frequency;
   window generating means connected to said digital/analog converter for generating a window signal representing nip width;
   gating means connecting said clock means and said window generating means to said digital display means to cause said display means to accumulate pulse count; and
   revolution counting means coupled to the roll and connected to said gating means, said revolution counting means operable to inhibit said gating means upon counting a predetermined number of revolutions so that the accumulated pulse count represents the mean nip pressure.

5. A method of measuring nip pressure of a roll having a shell and rotating about an axis, comprising the steps of:
   sensing nip pressure at the inner surface of the roll shell;
   transmitting nip pressure information signals along the axis of rotation of the roll in accordance with electrical signals;
   receiving and converting the nip pressure information signals into an electrical analog signal; and
   applying the converted electrical signals to an indicator to provide a visual reading of nip pressure by
     generating impulses at a predetermined frequency,
     generating an electronic window from the analog signal representing nip width,
     counting and displaying the pulse count of pulses occurring during the window for each revolution of the roll,
     counting revolutions of the roll, and
     inhibiting counting after a predetermined number of revolutions so that the display represents the average nip pressure over the predetermined number of revolutions of the roll.

6. The method of claim 5, wherein the step of transmitting is further defined as
   generating and radiating electromagnetic waves along the axis of rotation of the roll.

7. The method of claim 5, wherein the step of transmitting is further defined as
   generating and radiating electromagnetic waves in the light spectrum along the axis of rotation of the roll.

* * * * *